(12) United States Patent
Yoshino et al.

(10) Patent No.: US 6,181,462 B1
(45) Date of Patent: Jan. 30, 2001

(54) SECOND HARMONIC WAVE-GENERATION DEVICE

(75) Inventors: Takashi Yoshino, Ama-Gun; Minoru Imaeda, Nagoya; Makoto Iwai, Kasugai, all of (JP)

(73) Assignee: NGK Insulators, Ltd., Nagoya (JP)

( * ) Notice: Under 35 U.S.C. 154(b), the term of this patent shall be extended for 0 days.

(21) Appl. No.: 09/321,057

(22) Filed: May 27, 1999

(30) Foreign Application Priority Data

May 27, 1998 (JP) .................................................. 10-145615

(51) Int. Cl.⁷ ................................ G02F 2/02; G02F 1/35
(52) U.S. Cl. .............................................. 359/328; 252/584
(58) Field of Search ................................... 359/326–332; 372/21–22; 385/122; 252/584

(56) References Cited

U.S. PATENT DOCUMENTS 4,740,265  4/1988  Bierlein et al. .
5,737,117 * 4/1998  Imaeda et al. ...................... 359/332

FOREIGN PATENT DOCUMENTS

| 5-173213 | 7/1993 | (JP) . |
| 5-289131 | 11/1993 | (JP) . |
| 6-51359 | 2/1994 | (JP) . |
| 8-259375 | 10/1996 | (JP) . |
| 8-319191 | 12/1996 | (JP) . |
| 8-339002 | 12/1996 | (JP) . |

* cited by examiner

Primary Examiner—James Phan
(74) Attorney, Agent, or Firm—Burr & Brown

(57) ABSTRACT

A second harmonic wave-generation device for generating a second harmonic wave composed of an extraordinary ray from a fundamental wave composed of an ordinary ray, including a solid crystal of lithium potassium niobate-lithium potassium tantalate solid solution crystal or a single crystal made of lithium potassium niobate, wherein a mode field diameter of the fundamental wave inside the second harmonic wave-generation device is greater than that of the second harmonic wave.

7 Claims, 4 Drawing Sheets

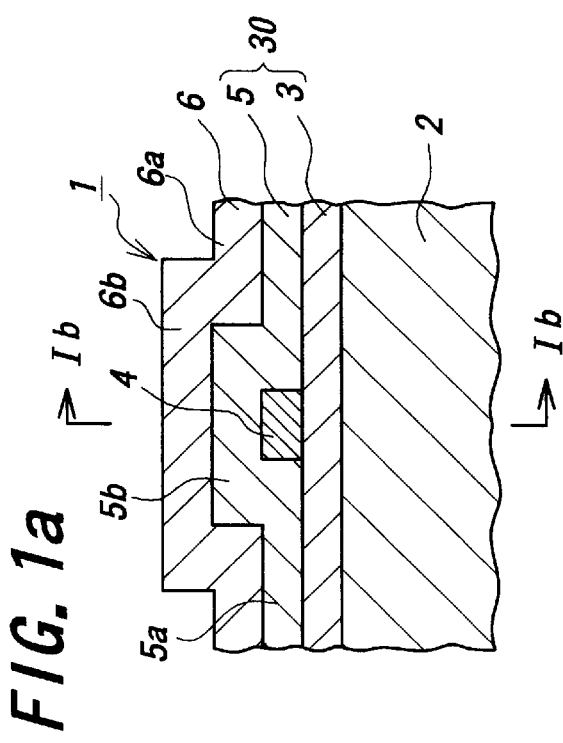
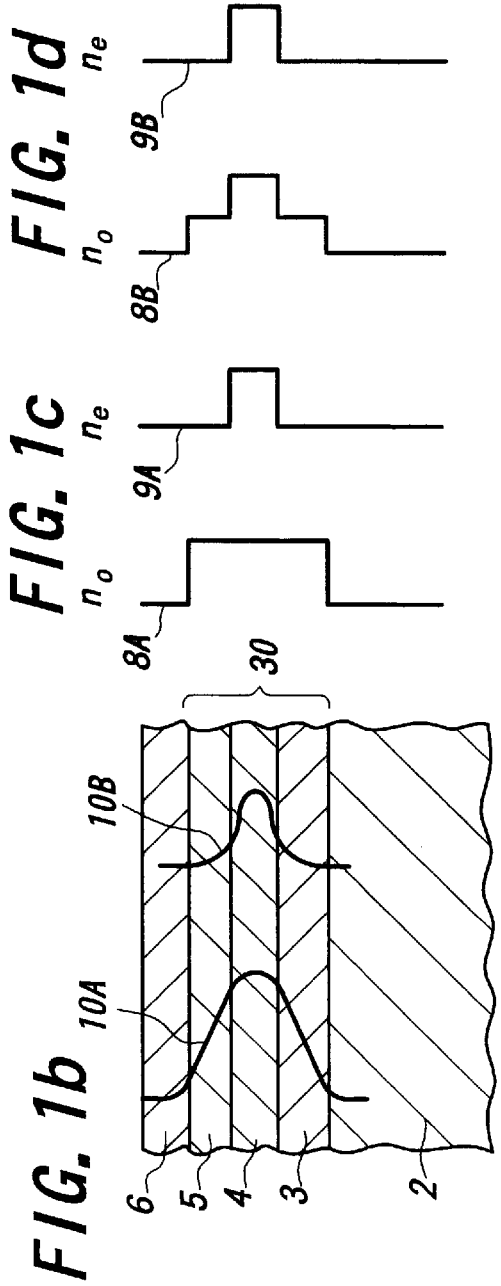

SECOND HARMONIC WAVE-GENERATION DEVICE

BACKGROUND OF THE INVENTION

1. Field of the Invention

This invention relates to a second harmonic wave-generation (SHG) device preferably usable for a blue laser source device or the like.

2. Related Art Statement

A device to generate a blue laser is suggested which is made by forming an optical waveguide having a periodically polarization-inversed structure and in which an infrared wave semiconductor laser is introduced into the optical waveguide (U.S. Pat. No. 4,740,265, JP-A-5-289131, and JP-A-5-173213). For example, JP-A-6-51359 discloses a SHG device in which a polarization inversion layer, an optical waveguide, a dielectric film, and a reflective grating layer are formed and the thickness of the dielectric film is limited to a given value.

Although these techniques require domains to be controlled at a high precision, such high precision domain-controlling is very difficult. An allowable temperature for the phase-matching must be controlled within a range of $\pm 0.5°$ C. Moreover, light damage of the optical waveguide may be recognized with an optical energy of 3 mW or more. Considering these phenomena, it is pointed out that these devices have a problem when used practically.

On the other hand, NGK Insulators, Ltd. suggested in JP-A-8-339002a SHG device having a reduced light damage without need for quasi-phase-matching or controlling the domains at a high precision. In this literature, a so-called single crystal substrate made of lithium potassium niobate or tantarium-substituted lithium potassium niobate is prepared by a micro pull-down process, and an optical waveguide made of the same material as that of the substrate is formed thereon.

This second harmonic wave-generation device was epock-making in that the optical waveguide for the wavelength conversion successfully reduced an optical loss to a large extent, and for the first time offered a possibility of providing a practical device of this type.

However, it became clarified that the second harmonic wave-generation device needed to be improved in the following respect. That is, the fundamental wave and the second harmonic wave are transmitted through the optical waveguide made of the specific single crystal mentioned above in the second harmonic wave-generation device of this type. Therefore, since the fundamental wave largely differs from the second harmonic wave in terms of the wavelength, the second harmonic wave is of a multi-mode if the transmission mode of the fundamental wave is a single mode. Further, it turned out that a design to make both the fundamental wave and the second harmonic wave of the single mode was not practical. If the second harmonic wave is of a multi-mode, phase matching occurred with respect a wavelength as not aimed at. Further, if the fundamental wave is fluctuated, the second harmonic wave is also fluctuated, so that the oscillation may not stably occur.

SUMMARY OF THE INVENTION

It is therefore an object of the present invention to provide a second harmonic wave-generation device for generating second harmonic waves composed of extraordinary rays from fundamental waves composed of ordinary rays, wherein the second harmonic waves can be prevented from being adversely influenced with the condition, properties and/or the fluctuation of the fundamental wave.

A first aspect of the present invention relates to a second harmonic wave-generation device for generating a second harmonic wave composed of an extraordinary ray from a fundamental wave composed of an ordinary ray, comprising a solid crystal of lithium potassium niobate-lithium potassium tantalate solid solution crystal or a single crystal made of lithium potassium niobate, wherein a mode field diameter of the fundamental wave inside the second harmonic wave-generation device is greater than that of the second harmonic wave.

A second aspect of the present invention relates to a second harmonic wave-generation device for generating a second harmonic wave composed of an extraordinary ray from a fundamental wave composed of an ordinary ray, comprising a solid crystal of lithium potassium niobate-lithium potassium tantalate solid solution single crystal or a single crystal composed of lithium potassium niobate, wherein said second harmonic wave-generating device comprises first and second core portions, as viewed in a plane vertical to an advancing direction of the fundamental wave, a refractive index of the fundamental wave in the first core portion is higher than that in the remainder of the second harmonic wave-generating device, whereas a refractive index of the second harmonic wave in the second core portion is higher than that in remainder, and the first core portion encloses the second one.

BRIEF DESCRIPTION OF THE DRAWINGS

For a better understanding of the invention, reference is made to the attached drawings, wherein:

FIG. 1(a) is a cross-sectional view schematically showing a part of a second harmonic wave-generation device 1 according to one embodiment of the present invention, FIG. 1(b) being a vertically sectional view of a part of the device 1, and FIGS. 1(c) and 1(d) being diagrams showing distributions of refractive indexes of the fundamental wave and the second harmonic wave;

DETAILED DESCRIPTION OF THE INVENTION

Figure 2:
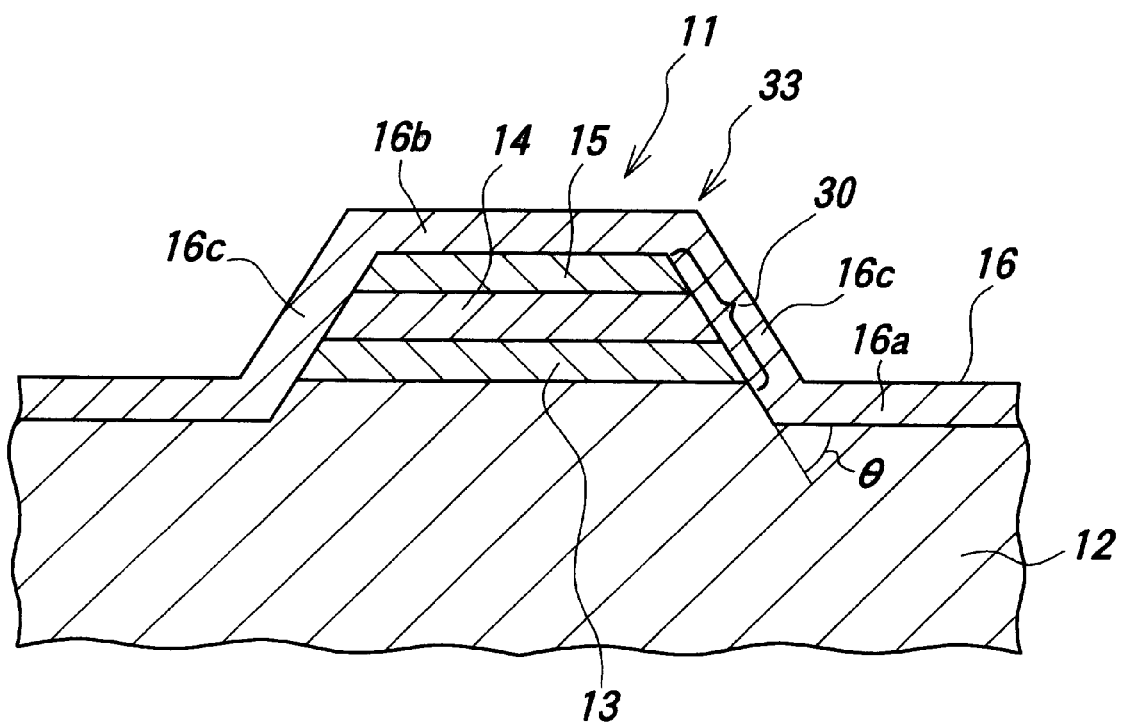
FIG. 2 is a cross-sectional view schematically showing a part of a second harmonic wave-generation device 11 according to another embodiment of the present invention.

The present inventors paid attention to the fact that a single crystal made of lithium potassium niobate-lithium potassium tantalate solid solution (often called "KLNT crystal", hereinafter) and a single crystal of lithium potassium niobate (often called "KLN crystal") have a characteristic of converting fundamental waves composed of ordinary rays into second harmonic waves composed of extraordinary rays in an optical waveguide. Further, they noted that in such crystalline systems, the refractive index of the ordinary rays could be controlled separately from controlling that of the extraordinary rays. Then, they reached a technical idea that a zone through which mainly the extraordinary rays propagate is enclosed with a zone though which mainly the ordinary rays propagate.

As a result, the inventors first succeeded in provide the second harmonic wave-generation device in which the second harmonic waves are not adversely influenced with the state and the characteristics of the fundamental waves as the ordinary rays.

More specifically, for example, if the second harmonic wave-generation element is so designed that the propagation of the fundamental waves may be of a single mode, the first core portion through which the fundamental waves propagate can be made larger than the second core portion through which the second harmonic waves propagate. Therefore, the propagation of the second harmonic waves can be of a single mode by appropriately set the size of the second core portion.

Further, even if the fundamental waves fluctuate, such fluctuation of the fundamental waves are unlikely to be transmitted to the second harmonic waves, because the luminous flux of the second harmonic waves is smaller than that of the fundamental waves.

If the second harmonic wave-generation device is provided with a reflective grating portion for fixing the wavelength of the fundamental waves, the wavelength of the fundamental waves is fixed by oozing a part of the fundamental waves toward the reflective grating portion, reflecting it there and returning the reflected waves to the laser source when the fundamental waves propagate the first core portion. At that time, the reflective grating portion may be provided at an outer side of the second core portion, so that the reflection of the fundamental waves may be prevented from influencing the second harmonic waves.

The feature that in the second harmonic wave-generation device, the mode field diameter of the fundamental waves is greater than that of the second harmonic waves means that the mode field diameters of both of them can be discriminated from each other by an ordinary mode field diameter-measuring technique. Preferably, the former mode field diameter differs from the latter preferably by not less than 0.5 μm and more preferably by not less than 2.0 μm.

The mode field diameter of the fundamental waves is not limited, but it is particularly preferably 4.0 to 7.0 μm. The mode field diameter of the second harmonic waves is not limited, but it is particularly preferably 2.5 to 5.0 μm.

In the present invention, the second core portion of which the refractive index of the second harmonic wave is higher is enclosed with the first core portion of which the refractive index of the ordinary waves is higher. This means that the first core portion can be discriminated from the second core portion by a common optical waveguide-producing technique. However, the outer periphery of the first core portion is separated from that of the second core portion preferably by not less than 0.2 μm and particularly preferably by not less than 1.0 μm.

In the present invention, preferably a clad portion is provided outside the first core portion, the refractive index of the fundamental waves in the first core portion is higher than that in the clad portion. This means that the refractive index of the fundamental waves so differs between the first core portion and the clad portion that the fundamental waves may be confined in the first core portion. Particularly preferably, the refractive index of the former differs from that of the latter by not less than 0.005.

In the present invention, the first core portion comprises a refractive index-adjusting portion at an outer side of the second core portion, and the refractive index of the second harmonic wave in the second core portion is higher than that in the refractive index-adjusting portion. That is, the refractive index-adjusting portion functions as a clad portion for the extraordinary rays.

In the present invention, the refractive index of the fundamental wave in the second core portion is higher than that in the refractive index-adjusting portion. That is, the refractive index of the fundamental waves varies by at least two steps in the first core portion. In this case, the second harmonic wave-generating efficiency can be further enhanced. Particularly when the reflective grating portion is provided, the amount of the fundamental rays oozed to the reflective grating portion can be controlled by adjusting the refractive index of the refractive index-adjusting portion.

The second harmonic wave-generation device according to the present invention can generate ultraviolet rays in a range of 390 nm to 470 nm, for example. Therefore, the second harmonic wave-generation device can be applied widely to optical disc memory, medicine, optochemistry and various optical measurements by utilizing such a short wavelength light.

The refractive index of each of the constituent parts of the second harmonic wave-generation device is controlled as mentioned before by forming the constituent parts, particularly each of the first core portion, the second core portion and if necessary the clad portion with a KLNT crystal or KLN crystal and changing the compositions thereof. At that time, as the ratio of the substituted amount of niobium to that of tantalum in the KLN or KLNT composition increases, the refractive index of the ordinary ray in the single crystal increases. As the ratio of lithium to the total substituted amount of the niobium and tantalum decreases, the refractive index of the extraordinary ray in the single crystal increases.

Therefore, if the ratio of Nb/Ta in the first core portion, particularly in the refractive index-adjusting portion is made greater than that in the clad portion, the refractive index of the ordinary ray in the first core portion can be made larger than that in the clad portion. Further, if the ratio of Li/(Ta+Nb) in the second core portion is made smaller than that in the refractive index-adjusting portion, the refractive index of the extraordinary ray in the second core portion can be made larger than that in the refractive index-adjusting portion.

In the present invention, the composition of each of the constituent parts of the device is not particularly limited, but they have preferably the following compositions.
(1) Second core portion

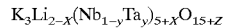

$$K_3Li_{2-X}(Nb_{1-y}Ta_y)_{5+X}O_{15+Z}$$

in which X=0.005–0.1, particularly preferably 0.02–0.1, and Y=0.00 to 0.1, particularly preferably 0.00–0.05.
(2) First core portion

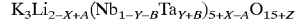

$$K_3Li_{2-X+A}(Nb_{1-Y-B}Ta_{Y+B})_{5+X-A}O_{15+Z}$$

in which A=0.005–0.1, particularly preferably 0.01–0.05, and B=0.00 to 0.1, particularly preferably 0.00–0.05.
(3) Clad portion

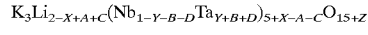

$$K_3Li_{2-X+A+C}(Nb_{1-Y-B-D}Ta_{Y+B+D})_{5+X-A-C}O_{15+Z}$$

in which C=0.005–0.1, particularly preferably 0.01–0.05, D=0.005 to 0.1, particularly preferably 0.01–0.05, A+C is 0.01–0.2, particularly preferably 0.02–0.1, and B+D is 0.01–0.2, particularly 0.03–0.05. X,Y,Z,A and B denote the same meanings as given above, respectively.

In the present invention, as mentioned later, it is particularly preferred that the second core portion is sandwiched between refractive index-adjusting portions from its opposite sides. It is found that if such is employed, an integrated value of an overlapped mode portion between the fundamental wave and the second harmonic wave increases to conspicuously enhance the generating efficiency of the second harmonic waves.

The composition of each of the second core portion, the core portion and the clad portion is mentioned above, and the tungsten-bronze structure composed of K, Li, Nb, Ta and O is considered there. However, the composition may be replaced by other element(s) other than K, Li, Nb, Ta and O in such an amount that this structure is still maintained. For example, K and Li may be partially replaced by Na, Rb or the like. A laser-oscillating doping agent such as Cr and a rare earth element including Er and Nd may be incorporated in the composition.

The second harmonic wave-generation device is preferably of a planar shape, but may be of a fibrous shape. If the device is of a fibrous shape, a second core portion is to be arranged in a central portion of the fibrous device, and a first core portion and a clad portion may be successively provided to cover the periphery of the second core portion.

If a single crystal substrate is used as the clad portion of the second harmonic wave-generation device, such a single crystal substrate as obtained by the micro pull-down method proposed in JP-A-8-259375 and JP-A-8-319191 is preferred.

The clad portion, the refractive index-adjusting portion and the second core portion may be formed by the metalorganic chemical vapor deposition method or the liquid phase epitaxial method.

In the device 1 shown in FIGS. 1(a) to 1(d), a first core portion 30 is provided on a main plane of an underclad portion made of a substrate of a KLNT crystal, and an overclad portion 6 is formed on the first core portion 30. The first core portion 30 includes an upper refractive index-adjusting portion 5 and a lower refractive index-adjusting portion 3. A second core portion 4, which constitutes a three-dimensional optical waveguide, is arranged between the refractive index-adjusting portions 3 and 5. The upper refractive index-adjusting portion 5 includes a flat portion 5a formed on the refractive index-adjusting portion 3, and a cover portion 5b covering the second core portion 4. The overclad portion 6 includes a flat portion 6a provided on the upper refractive index-adjusting portion 5 and a cover portion 6b covering the second core portion 4.

As shown in FIG. 1(b), an ordinary ray 10A propagates within the first core portion 30, whereas an extraordinary ray 10B does within the second core portion 4. At this time, as shown in FIG. 1(c), for example, the refractive index of the ordinary ray in the first core portion 30 can be made constant. Particularly preferably, as shown in FIG. 1(d), the refractive index of the ordinary ray in the second core portion 4 is greater than that in the refractive index-adjusting portions 3 and 5.

In a second harmonic wave-generation device 11 schematically shown in FIG. 2, a ridge-shaped structure 33 is formed on a main plane of an underclad portion 12 made of a substrate of a KLNT crystal. The ridge-shaped structure 33 includes a first core portion 30, which includes a second core portion 14, an upper refractive index-adjusting portion 15 and a lower refractive index-adjusting portion 13. The main plane of the clad portion 12 is covered with a flat portion 16a of the overclad portion 16, and the ridge-shaped structure 33 is covered with overclad portions 16b, 16c.

An inclined angle θ of a side surface of the ridge-shaped structure to the surface of the underclad portion 12 can be made smaller than 90 degrees. More specifically, the inclined angle may be set at 60 to 120 degrees. This inclined angle influences the propagation loss.

Figure 3:
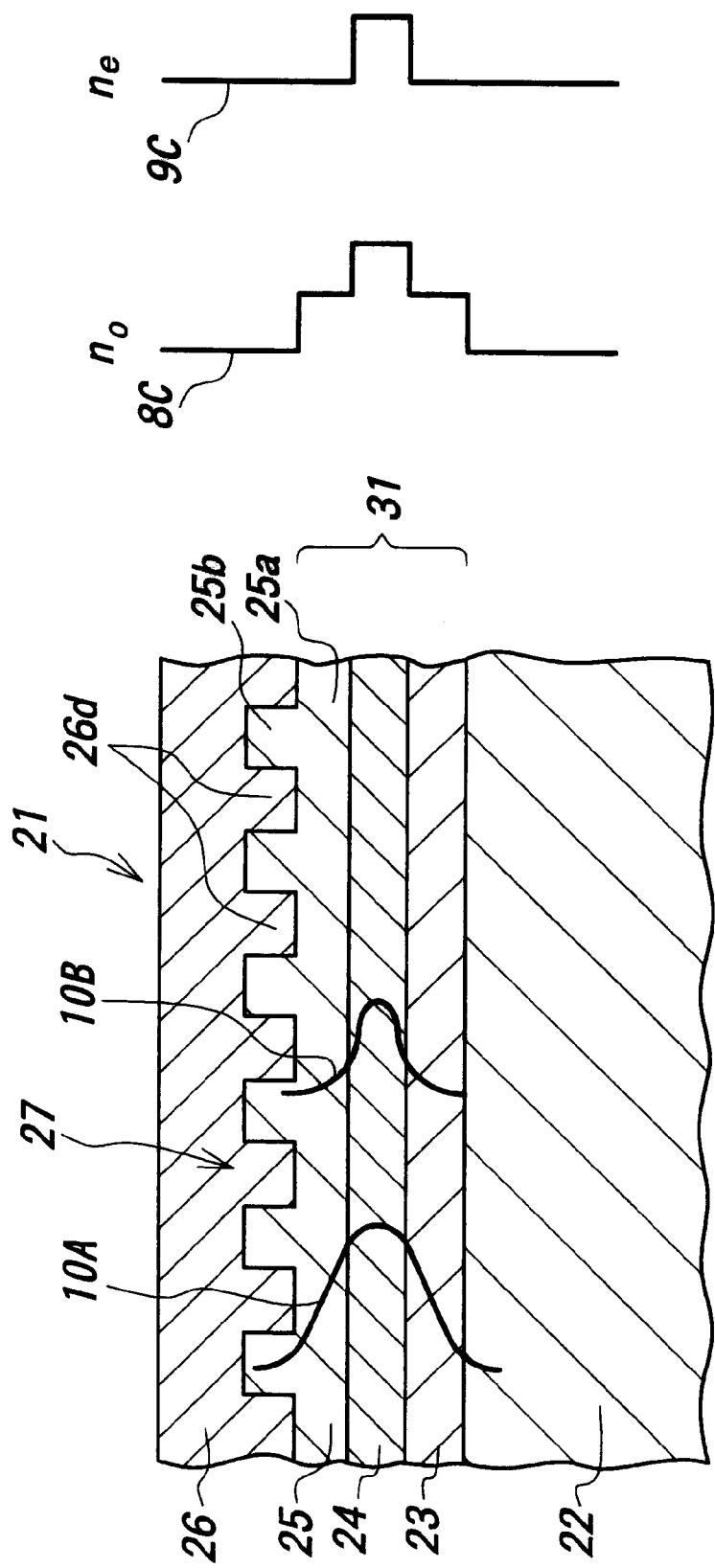
FIG. 3(a) is a vertically sectional view of a second harmonic wave-generation device 21 according to a further embodiment of the present invention, FIG. 3(b) being diagrams showing distributions of refractive indexes of the fundamental wave and the second harmonic wave.
Figure 4:
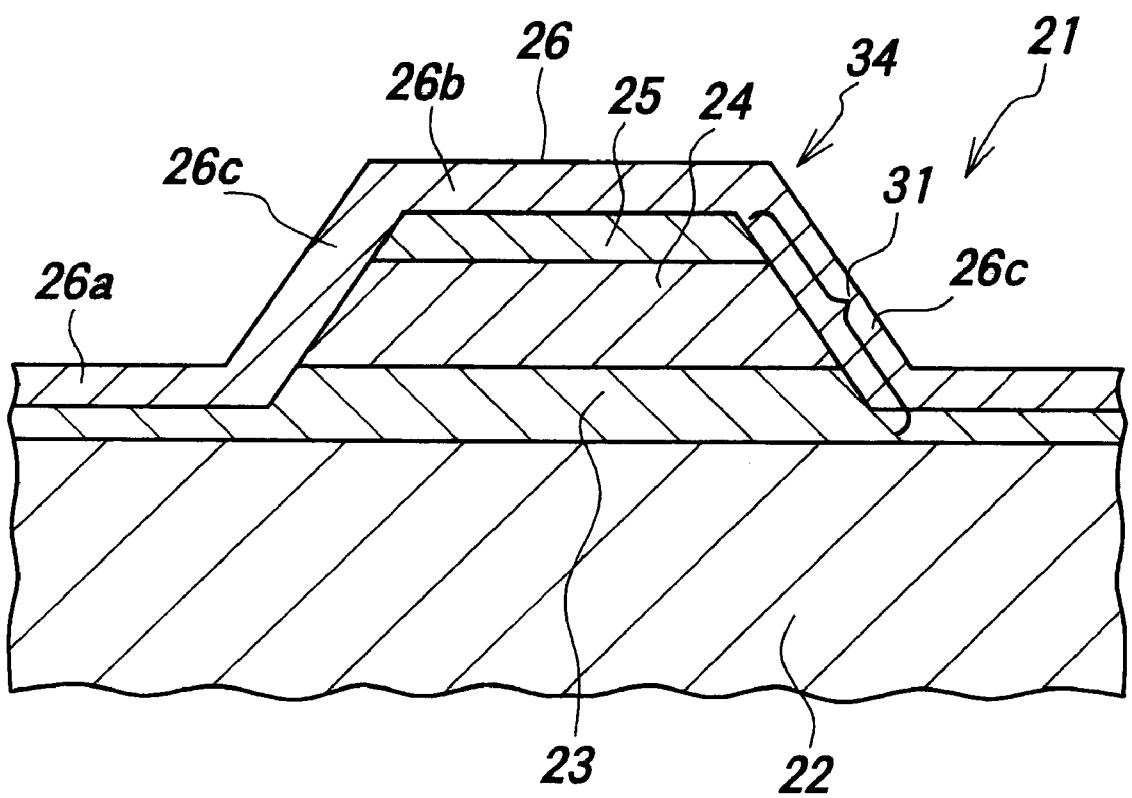
FIG. 4 is a cross-sectional view of the device 21 according to the further embodiment of the present invention.

FIGS. 3(a) and 3(b) and FIG. 4 schematically show a second harmonic wave-generation device according to other embodiment of the present invention.

As shown in FIG. 4, a lower refractive index-adjusting portion 23 is provided on a main plane of an underclad portion 22 made of a KLNT crystal substrate. A second core portion 24 is provided on the refractive index-adjusting portion 23, and an overclad portion 25 is provided on the second core portion 24. A first core portion 31 is constituted by 23, 24, 25. The lower refractive index-adjusting portion 23 is covered with a flat portion 26a of the overclad portion 26, and the surface of the ridge-shaped structure 34 is covered with overclad portions 26b and 26c.

As shown in FIGS. 3(a) and 3(b), a reflective grating portion 27 is formed at an interface between the upper refractive index-adjusting portion 25 and the overclad portion 26. The upper refractive index-adjusting portion 25 includes a flat portion 25a and a number of projections 25b, which are provided alternatively with projections 26d of the overclad portion 26. fundamental wave 10A propagates within the first core portion 31, and passes through the reflective grating portion. The light returning from the reflective grating portion fixes the wavelength of the fundamental.

EXAMPLES

Experiment A

A device 11 as shown in FIG. 2 was produced.

First, a single crystal plate 12 made of KLNT was prepared by the micro pull-down method. More particularly, potassium carbonate, lithium carbonate, niobium chloride and tantalum oxide were formulated at a compounding ratio of 30.0: 24.0: 45.08: 0.92, thereby preparing a raw material powder. Into a platinum crucible was charged about 50 g of the raw material powder, which was heated at 1150° C. to melt the raw material. The raw material was melted inside the crucible in the state that the temperature of a space inside a furnace was adjusted in a range of 1100 to 1200° C. While the temperature of a single crystal-growing portion was set at 1050° C. to 1150° C., a C-face plate was pulled down along an "a"-axis direction of a crystal at a speed of 10 mm/hour through a nozzle provided at a bottom of the crucible. As a result, a single crystal substrate, 1 mm thick, 30 mm wide and 30 mm long, was grown. This substrate was used as an underclad portion. The substrate had a composition of $K_3Li_2(Nb_{0.97}Ta_{0.03})_5O_{15}$. Next, epitaxial films 13, 14 were formed by the metalorganic chemical vapor deposition method. Concretely, as each starting material, di-pipaloyl-methanato potassium [$K(C_{11}H_{19}O_2)$ (referred to as "K(DPM)", hereinafter)], di-pipaloyl methanato lithium [$Li(C_{11}H_{19}O_2)$ (referred to as "Li(DPM)", hereinafter)], or penta-ethoxy niobium [$Nb(OC_2H_5)_5$ (referred to as "Nb(PE)", hereinafter)] was employed. They were charged into respective source containers, thereafter heated to respective gasfication temperatures to gasfy them. Each gas was introduced into a reactor chamber with use of a Ar carrier gas controlled at its flow rate.

Under the condition that the pressure in the reactor chamber was 20 Torr and the temperature of the substrate was 650° C., films 13, 14, 15 were formed for 3 hours. The composition of the thus obtained film 13 was $K_3Li_{2.00}Nb_{5.00}O_{15}$, that of the film 14 was $K_3Li_{1.95}Nb_{5.05}O_{15}$, and that of the film 15 was $K_3Li_{2.00}Nb_{5.00}O_{15}$.

A strip-like film pattern of Ti was formed at a pitch of 2 mm in a thickness of 1 μm, a width of 5 μm and a length of 25 mm by a normal photolithography. The thus obtained sample was processed by a reactive ion etching method. In this case, the sample was processed at a RF electric power of 250W for 100 minutes with $C_2F_6$ and $O_2$ gases under pressure of 0.02 Torr to form a ridge-shaped structure 33 as shown in FIG. 2. The inclined angle θ was 63 degree.

An overclad portion 16 was formed on this sample by the metalorganic chemical vapor deposition method as mentioned above. The flow rates of gasses were 200 ml/min for K(DPM), 600 ml/min for Li(DPM), 150 ml/min for Nb(PE), and 20 ml/min for pentaethoxy tantulum [$Ta(OC_2H_5)_5$]. Under the condition that the pressure in a reactor chamber was 20 Torr and the temperature of the substrate was 650° C., a KLNT single crystal film 16 was formed in a thickness of 2.2 μm in 2 hours. The composition of the thus obtained film was $K_3Li_{2.00}(Nb_{0.97}Ta_{0.03})_{5.00}O_{15}$.

The thus obtained sample was cut out to form chip elements in a length of 10 mm and a width of 2 mm as viewed in a direction of the optical waveguide. An input end and an output end of the element were optically polished, and coated with an anti-reflective film having a reflective index of 0.5% at a wavelength of 860 nm and an anti-reflective film having a reflective index of 0.5% at a wavelength of 430 nm, respectively. A titanium-sapphire laser was led into the element. Consequently, the laser was phase-matched at a wavelength of 852 nm to obtain a second harmonic wave having an output power of about 2.2 mW at 426 nm, when the input power from the laser was 80 mW. In each case, the propagation was of a single mode.

Experiment B

A device as shown in FIGS. 3 and 4 was produced.

In the same manner as in Experiment A, a substrate 22 having a composition of $K_3Li_{2.00}(Nb_{0.97}Ta_{0.03})_{5.00}O_{15}$ was prepared.

Next, a lower refractive index-adjusting portion 23 having a composition of $K_3Li_{1.95}(Nb_{0.98}Ta_{0.02})_{5.00}O_{15}$ was formed on the substrate 22, and a second core portion 24 having a composition of $K_3Li_{1.95}Nb_{5.05}O_{15}$ was formed on it. A ridge was formed by irradiating a KrF eximer laser beam upon the resultant. Then, an upper refractive index-adjusting portion 25 having a composition of $K_3Li_{1.95}(Nb_{0.98}Ta_{0.02})_{5.05}O_{15}$ was formed on the ridge by the metalorganic chemical vapor deposition method.

A mask pattern of Ti was formed at a pitch of 0.4 μm in a thickness of 100 nm was formed on the refractive index-adjusting portion 25, and a reflective grating portion 27 was formed in a depth of 0.1 μm and a length of 1.8 mm by reactive etching with use of a $CF_4+O_2$ gas. A light propagating direction was taken in an "a"-axis direction.

Then, an overclad portion 26 having a composition of $K_3Li_{2.00}(Nb_{0.97}Ta_{0.03})_{5.05}O_{15}$ was formed on the surface of the refractive index-adjusting portion 25 by the metalorganic chemical vapor deposition method.

It was found that a single mode optical waveguide was obtained at a wavelength range of 811 to 878 nm when a laterally polarized beam was led into the device.

The thus obtained sample was cut out to form chip elements in a length of 10 mm and a width of 2 mm as viewed in a direction of the optical waveguide. An input end and an output end of the element were optically polished, and coated with an anti-reflective film having a reflective index of 0.5% at a wavelength of 860 nm ±2 nm and an anti-reflective film having a reflective index of 0.5% at a wavelength of 430 nm ±1 nm, respectively.

A laser diode having an oscillating wavelength of 860 nm ±15 nm was directly coupled with this device, so that the wavelength was fixed at 863.4 nm by the reflective grating portion of the device. When the device and the laser diode were heated by a Peltier element, the laser was phase-matched at a wavelength of 864.1 nm at 36.3° C. to obtain a second harmonic wave having an output power of 12 mW, when the input power from the laser was 102 mW.

As above mentioned, according to the present invention, the second harmonic waves can be prevented from being adversely influenced with the condition, the characteristics and fluctuations of the fundamental waves in the second harmonic wave-generation device in which the second harmonic waves composed of the extraordinary waves are generated from the fundamental waves composed of the ordinary rays.

What is claimed is:

1. A second harmonic wave-generation device for generating a second harmonic wave composed of an extraordinary ray from a fundamental wave composed of an ordinary ray, comprising a solid crystal of lithium potassium niobate-lithium potassium tantalate solid solution crystal or a single crystal made of lithium potassium niobate, wherein a mode field diameter of the fundamental wave inside the second harmonic wave-generation device is greater than that of the second harmonic wave.

2. The second harmonic wave-generation device claimed in claim 1, wherein a center of the fundamental wave is substantially in conformity with that of the second harmonic wave.

3. A second harmonic wave-generation device for generating a second harmonic wave composed of an extraordinary ray from a fundamental wave composed of an ordinary ray, comprising a solid crystal of lithium potassium niobate-lithium potassium tantalate solid solution single crystal or a single crystal composed of lithium potassium niobate, wherein said second harmonic wave-generating device comprises first and second core portions, as viewed in a plane vertical to an advancing direction of the fundamental wave, a refractive index of the fundamental wave in the first core portion is higher than that in the remainder of the second harmonic wave-generating device, whereas a refractive index of the second harmonic wave in the second core portion is higher than that in the remainder, and the first core portion encloses the second one.

4. The second harmonic wave-generating device set forth in claim 3, wherein a clad portion is provided outside the first core portion, a refractive index of the fundamental wave in the first core portion is higher than that of the clad portion.

5. The second harmonic wave-generating device set forth in claim 3, wherein the first core portion comprises a refractive index-adjusting portion at an outer side of the second core portion, and the refractive index of the second harmonic wave in the second core portion is higher than that in the refractive index-adjusting portion.

6. The second harmonic wave-generating device set forth in claim 5, wherein the refractive index of the fundamental wave in the second core portion is higher than that in the refractive index-adjusting portion.

7. The second harmonic wave-generating device set forth in claim 3, wherein the first core portion comprises a reflective grating portion for fixing a wavelength of the fundamental wave entering the first core portion.

* * * * *